(12) United States Patent
Emery et al.

(10) Patent No.: US 8,594,744 B2
(45) Date of Patent: *Nov. 26, 2013

(54) SYSTEM AND METHODS FOR ADAPTIVELY SWITCHING A MOBILE DEVICE'S MODE OF OPERATION

(75) Inventors: Jeffrey Emery, Ottawa (CA); Nicholas Wilson, Ottawa (CA)

(73) Assignee: BlackBerry Limited, Waterloo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/617,300

(22) Filed: Sep. 14, 2012

(65) Prior Publication Data

US 2013/0078981 A1  Mar. 28, 2013

Related U.S. Application Data

(63) Continuation of application No. 11/378,364, filed on Mar. 20, 2006, now Pat. No. 8,290,543.

(51) Int. Cl.
*H04M 1/00* (2006.01)

(52) U.S. Cl.
USPC ............... 455/569.1; 455/570; 455/572.2

(58) Field of Classification Search
USPC ........... 455/558, 406–407, 569.1, 570, 575.2, 455/550.1, 575.1–575.6, 563, 67.11; 902/26; 235/379, 380, 375
See application file for complete search history.

(56) References Cited

U.S. PATENT DOCUMENTS

| | | | |
|---|---|---|---|
| 5,224,151 A | 6/1993 | Bowen et al. | |
| 5,712,911 A | 1/1998 | Her | |
| 6,223,154 B1 | 4/2001 | Nicholls et al. | |
| 6,250,557 B1 * | 6/2001 | Forslund et al. | 235/492 |
| 6,298,247 B1 | 10/2001 | Alperovich et al. | |
| 6,411,828 B1 | 6/2002 | Lands et al. | |
| 6,453,041 B1 | 9/2002 | Eryilmaz | |
| 6,473,629 B1 | 10/2002 | Chang | |
| 6,547,620 B1 * | 4/2003 | Hatamura et al. | 455/415 |
| 6,587,553 B1 | 7/2003 | Shaffer et al. | |
| 6,741,873 B1 * | 5/2004 | Doran et al. | 455/569.1 |
| 7,174,293 B2 * | 2/2007 | Kenyon et al. | 704/231 |

(Continued)

OTHER PUBLICATIONS

Canadian Patent Application No. 2,581,591, Office Action dated Jun. 29, 2010.

(Continued)

*Primary Examiner* — Nay A Maung
*Assistant Examiner* — Angelica M Perez
(74) *Attorney, Agent, or Firm* — Moffat & Co.

(57) ABSTRACT

A system and methods are provided whereby a user of a mobile device can adaptively switch the mobile device from speakerphone mode to handset mode without needing to look at the mobile device or without the need to activate a button or key sequence. In a preferred embodiment, modules are provided in the mobile device which allow for the detection of a voice conversation, the sampling of the user's voice and the switching between the two modes of operation. If the user's voice volume is above a certain threshold the mobile device operates in handset mode. If the user's voice volume is below a certain threshold the mobile device operates in handset mode. Through the inclusion of the embodiments described herein, a mobile device can allow a user to safely and quickly switch from one mode of operation to the other without a requirement for additional hardware in the mobile device.

23 Claims, 4 Drawing Sheets

(56) References Cited

U.S. PATENT DOCUMENTS

| | | | |
|---|---|---|---|
| 7,346,315 B2* | 3/2008 | Zurek et al. | 455/90.3 |
| 8,290,543 B2* | 10/2012 | Emery et al. | 455/569.1 |
| 2002/0052754 A1* | 5/2002 | Joyce et al. | 705/1 |
| 2002/0086656 A1 | 7/2002 | Mattisson | |
| 2004/0103063 A1* | 5/2004 | Takayama et al. | 705/41 |

OTHER PUBLICATIONS

EP Patent Application No. 06111399.9, Communication pursuant to Article 96(2) EPC, dated Mar. 16, 2007.

EP Patent Application No. 06111399.9, Communication pursuant to Article 96(2) EPC, dated Oct. 22, 2007.

* cited by examiner

SYSTEM AND METHODS FOR ADAPTIVELY SWITCHING A MOBILE DEVICE'S MODE OF OPERATION

RELATED APPLICATION

The present application is a continuation of U.S. application Ser. No. 11/378,364 filed Mar. 20, 2006.

FIELD OF THE DISCLOSURE

The invention relates to the field of mobile communications and particularly to a system and methods for adaptively switching a mobile device's mode of operation.

BACKGROUND OF THE DISCLOSURE

Mobile devices, such as personal digital assistants (PDAs), cellular telephones and smartphones, for example, often provide a user with the ability to carry out voice conversations with other parties. These mobile devices provide a user with a voice conversation experience much like that of traditional, land line telephones. However, the fact that mobile device are in fact mobile or portable gives rise to certain new scenarios during which a voice conversation can be effectuated. For example, while driving a car, a user of a mobile device may receive a telephone call on their mobile device. Another example is that a user may bring their mobile device to their place of employment and receive personal telephone calls on their mobile device while at work.

Mobile devices are becoming increasingly feature rich as manufacturers try to attract the attention of increasingly discerning consumers. One such feature which is becoming more popular is the ability for a mobile device to enable voice conversations to be carried out using a speakerphone. In a voice conversation carried out using a speakerphone, the user of the mobile device does not need to hold the mobile device to their ear. The user's voice is captured by a microphone and the voice of the person at the other end of the conversation is relayed to the user using a speaker. Mobile devices featuring speakerphone ability allow the user to manually switch between traditional or handset mode (holding the mobile device up to one's ear, as with traditional land line telephones) and speakerphone mode. The switch between the two modes (handset mode and speakerphone mode) is traditionally carried out by, for example, the user's selection of a menu item on the screen of the mobile device or the user's activation of a predefined button or key sequence.

A user is therefore required to manually interact with the mobile device in order to switch between handset mode and speakerphone mode. This manual interaction requires a mobile device's user to look at the mobile device and may take a few seconds to execute.

A variety of solutions to this problem have been proposed. U.S. Pat. No. 5,224,151 to Donald J Bowen et al. is entitled "Automatic Handset-Speakerphone Switching Arrangement for Portable Communication Device" (the '151 patent). In the '151 patent, a portable communication device (mobile device) is disclosed which automatically transitions between a handset mode and a speakerphone mode based on a continuous distance measurement between the handset audio output device and the user's ear. This distance measurement is determined by an infrared range detection unit or other distance determination methods such as acoustic echo return systems built into the handset. However, the solution disclosed in the '151 patent requires that a distance measuring system be added to a mobile device. The '151 patent is predicated on a mobile device sending an output signal and waiting to receive that output signal back as an input signal in order to measure distance. The '151 patent discloses a system which may not work if the user of the mobile device were to place the mobile device in their pocket or in a holder for example, as the distance measurement could become inaccurate.

U.S. Pat. No. 6,411,828B1 to Lands et al. is entitled "Communications Devices and Methods that Operate According to Communications Device Orientations Determined by Reference to Gravitational Sensors" (the '828 patent). The '828 patent discloses that a mode of operation of a communications device transitions from the selected speakerphone mode to handset mode of operation based on movement of the communications device from a first orientation (eg. Vertical) to a second orientation (eg. Horizontal). The system disclosed requires that a gravitational sensor be added to a mobile device, increasing both the complexity and cost of the mobile device. Further, the system may not work as desired if the user would like to use speakerphone mode when their mobile device is not lying flat, when the mobile device is in a holder for example.

U.S. Pat. No. 5,712,911 to Ju-Won Her is entitled "Method and System for Automatically Activating and Deactivating Speakerphone" (the '911 patent). In the '911 patent is disclosed a system where a proximity sensor is used to determine if a phone call should be commenced in speakerphone mode. The embodiment disclosed includes commercially available infrared sensors to sense the presence or absence of the subscriber in the predetermined proximity zone. The '911 patent requires the use of an external proximity detection system attached to a user and is not geared towards a mobile device.

There is a need for an improved mobile device which allows a user to automatically switch between handset mode and speakerphone mode which overcomes some of the limitations presented by prior attempts to solve this problem.

BRIEF DESCRIPTION OF THE DRAWINGS

The accompanying drawings illustrate embodiments of the invention by way of example only. In the drawings.

DETAILED DESCRIPTION

The embodiments of the invention provide for a system and methods wherein a mobile device is capable of automatically alternating a voice conversation between handset mode and speakerphone mode so that the mobile device's user does not need to look at the mobile device and does not need to activate a button or key sequence to switch between the two modes of operation.

In one aspect of the invention, there is provided a method for adaptively switching a mode of operation of a mobile device, the method comprising detecting at the mobile device a voice conversation, sampling a user's voice during the voice conversation and selectively switching the mode of operation of the mobile device based on said sampling of the user's voice.

In another aspect of the invention, there is provided a mobile device capable of adaptively switching its mode of operation, the mobile device comprising a detecting module adapted to detect a voice conversation, a sampling module adapted to sample a user's voice during the detected voice conversation and a mode of operation module adapted to selectively switch the mobile device's mode of operation based on said sampling of the user's voice.

One advantage of the invention is to allow a user of a mobile device to automatically switch between speakerphone mode and handset mode without the requirement of adding an infrared sensor or gravitational sensor to a mobile device.

Another advantage of the invention is to allow a user of a mobile device to automatically switch between speakerphone mode and handset mode irrespective of where the mobile device is placed and how it is oriented.

Other advantages of the invention will be apparent to those skilled in the art from the following detailed description taken in conjunction with the drawings.

Embodiments of the invention will now be described in greater detail with reference to the accompanying drawings, in which like numerals refer to like parts.

Figure 1:
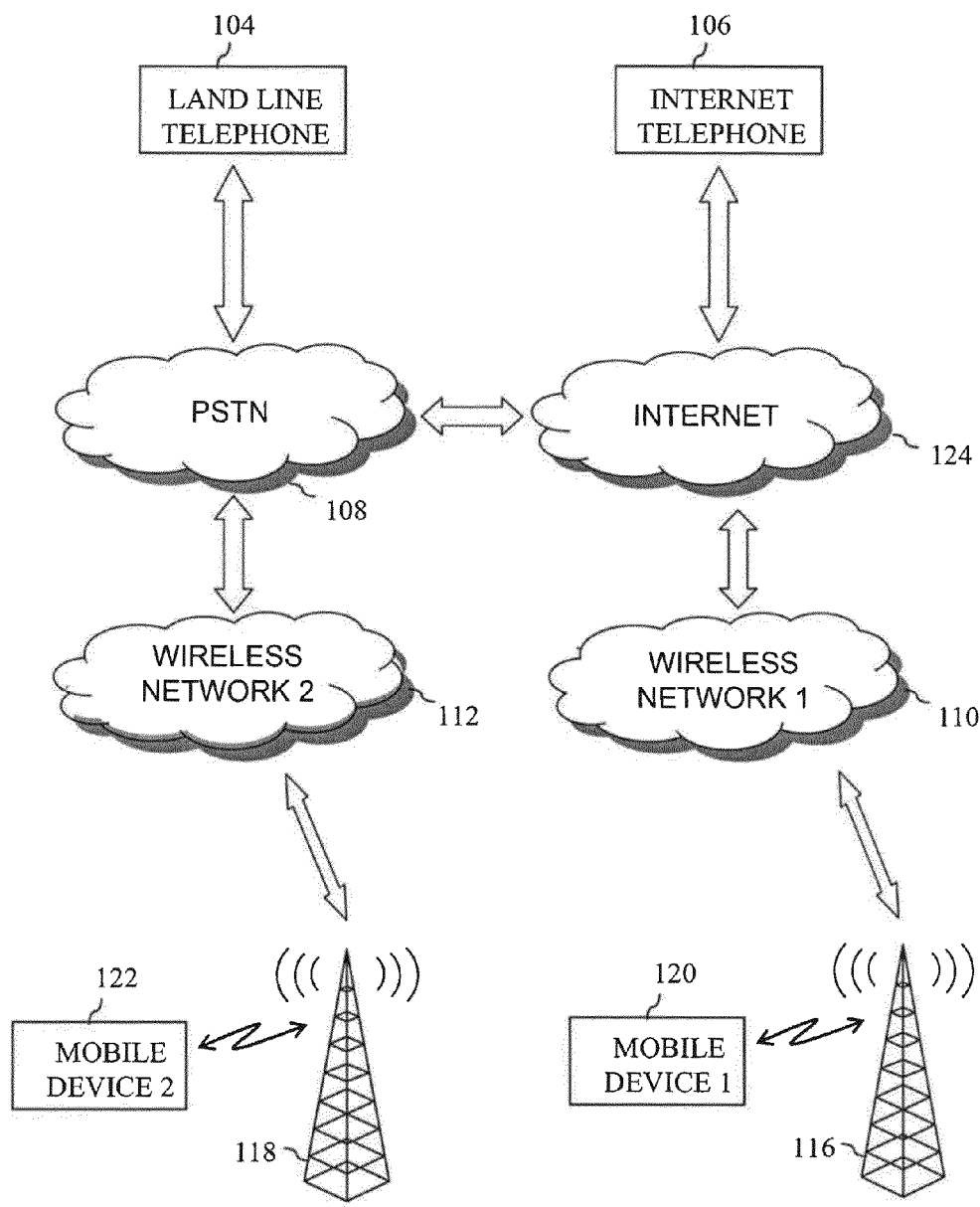
FIG. 1 is an exemplary environment in which a system and method in accordance with a preferred embodiment may be practiced.

FIG. 1 is an exemplary environment in which a communication system 100 in accordance with a preferred embodiment may be practiced. The exemplary communication system 100 includes a plurality of voice conversation capable devices. The voice conversation capable devices include land line telephone 104, internet telephone 106 and mobile devices 120 and 122.

Land line telephone 104 is any type of traditional telephone, capable only of voice conversation. Land line telephone 104 is capable of carrying out voice conversations with other voice capable telephones and devices through communication with a Public Switched Telephone Network (PSTN) 108.

Internet telephone 106 includes any telephone or telephone like device capable of voice conversations over the internet. Internet telephone 106 includes voice over IP capable devices for example. Internet phone 106 is capable of carrying out voice conversations with other voice capable telephones and devices through communication with the Internet 124.

Mobile devices 120 and 122 are any mobile device and could include, for example, two-way communication devices, possibly with advanced data communication capabilities. Mobile devices 120 and 122 also have the capability to allow voice conversations with other voice capable devices, such as another one of mobile devices 120 and 122, traditional land line telephone 104 and internet telephone 106 through communication with the respective one of base station 116 and 118 and wireless network 110 and 112.

Depending on the functionality provided, mobile devices 120 and 122 may be referred to as a data messaging device, a two-way pager, a cellular telephone, a wireless Internet appliance, a PDA or a smartphone. The preceding list is not meant to be exhaustive; the embodiments described herein can be practiced with any type of mobile device or portable telephone capable of carrying out voice conversations and having speakerphone capabilities, whether listed above or not.

Figure 2:
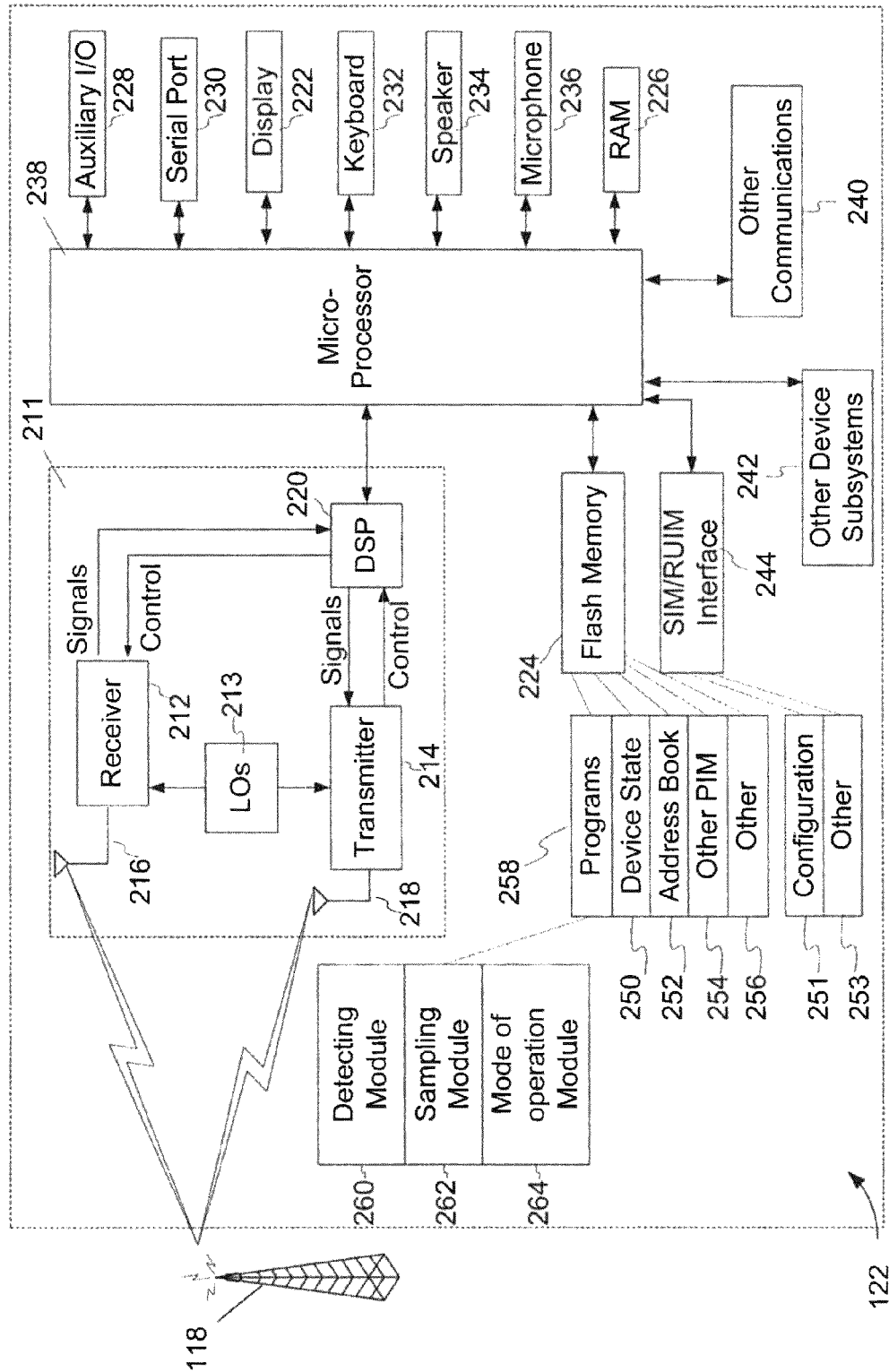
FIG. 2 is an exemplary mobile device in which a system and method in accordance with a preferred embodiment may be practiced.

The architecture of mobile devices 120 and 122 of FIG. 1 can be seen in greater detail in FIG. 2 which is a detailed view of mobile device 122, but is equally applicable to mobile device 120. Mobile device 122 contains a microprocessor 238, a radio 211, an information storage means 224, a microphone 236, a speaker 234 and at least one software module or program adapted to perform tasks (260, 262 and 264 for example). In a preferred embodiment, microphone 236 and speaker 234 may comprise multiple instances of microphone 236 and speaker 234 each instance adapted to function in one of handset mode or speakerphone mode. In another preferred embodiment, microphone 236 and speaker 234 are adapted to function in one of handset mode or speakerphone mode by varying the sensitivity and volume of microphone 236 and speaker 234 respectively.

Mobile device 122 is capable of communication with base station 118 through the use of radio 211. Radio 211 is capable of voice communication, but could also be capable of data communications. Microprocessor 238 directs the use of the radio and is responsible for coordinating the overall operation of mobile device 122. Interface elements: microphone 236, speaker 234, keyboard 232 and display 230 are all capable either of receiving a user's input, such as key presses or voice input, or providing a user with output, such as displaying visual elements or generating sound output. Mobile device 122 is capable of effectuating a voice conversation in one of two modes: handset mode and speakerphone mode in which different ones of speaker 234 and microphone 236 may be used. RAM 226 is capable of storing quickly accessible data for the microprocessor, such as processor instructions or data values. Flash memory 224 contains the long term information required by mobile device 122. This long term information includes programs 258 which include modules 260, 262 and 264 which are adapted to execute in microprocessor 238 and comprise binary code or computer executable instructions for example.

In a preferred embodiment mobile device 122 contains, in programs 258, three modules; a detecting module 260, a sampling module 262 and a mode of operation module 264. Modules 260, 262 and 264 could be separate modules or could be portions of a larger module for example.

Detecting module 260 is adapted to detect if a voice conversation is being carried out by a user of mobile device 122. Detecting module 260 detects that a voice conversation is being carried out, or about to be initiated by, preferably, checking a status value stored in RAM 226 by microprocessor. Detecting module 260 can use other means for detecting the existence of a voice conversation by, for example, checking a value stored in flash memory 224 or querying about the current status of radio 211 or monitoring user interaction with mobile device 122. The method in which detecting module 260 detects a voice conversation can be any method which can reliably allow the detecting module 260 to detect that a voice conversation is being effectuated at mobile device 122.

Detecting module 260 is further adapted to detect that a voice conversation is about to be initiated so that sampling module 262 may acquire samples prior to the voice conversation commencing to, for example, establish the ambient or background noise level. Detecting module 260 detects that a voice conversation is about to be initiated by, for example, monitoring the status of radio 211 or by checking a status value stored in RAM 226.

Sampling module 262 is adapted to sample a user's voice during a voice conversation or immediately prior to a voice conversation commencing.

In a first embodiment sampling module 262 is adapted to commence sampling the voice of a user of mobile device 122 upon detection of a voice conversation by detecting module 260. Sampling module 262 is adapted to determine periodic sample characteristics of a user's voice, such as the user's voice volume, frequency or other characteristics of the user's voice for example, in cooperation with microphone 236. Sampling module 262 is capable of generating a value based on the samples taken, the value being used for determining whether the user is holding mobile device 122 to their ear, or whether the user has placed mobile device 122 away from their ear for example. If the user is holding mobile device 122 to their ear, the volume of the user's voice, as sampled by sampling module 262, will be above a determined threshold value due to the proximity of mobile device 122 (and microphone 236) to the source of the user's voice. If the user has placed mobile device 122 away from their ear, mobile device 122 (and microphone 236) will be further from the source of the user's voice, and will be sampled at a volume level below a determined threshold value. The threshold value is preferably determined prior to detecting module 260 detecting a voice conversation through the execution of a training session by a training module (not shown) but alternatively could be determined during the voice conversation. Sampling module 262 is preferably adapted to determine whether or not the user of mobile device 122 is currently speaking so that samples wherein the user is not speaking can be filtered out. Sampling module 262 is preferably adapted to recognize the existence of user speech through the execution of a training session. In one embodiment, sampling module 262 is adapted to recognize a particular user's voice frequency pattern and will filter out samples which do not include the user's voice frequency pattern. In a similar manner, white noise or dead time during which the user is not speaking, will not be considered as samples by sampling module 262, effectively filtering these samples out, improving the ability of mobile device 122 to adaptively switch between handset mode and speakerphone mode. In another embodiment, sampling module 262 is further adapted to not acquire samples while speaker 234 is generating sound. If multiple users use the same mobile device 122, mobile device 122 determines which user is currently using mobile device 122 (by user log in, or voice characteristics for example) and filters samples according to that user's profile.

In a second embodiment sampling module 262 is adapted to commence sampling immediately prior to the commencement of a voice conversation. The samples taken prior to the commencement of a voice conversation are used to assess the ambient or background noise level. As will be further described below, the ambient noise level is used to vary a threshold value to ensure that the mode of operation module 264 determines the proper mode of operation for mobile device 122.

Mode of operation module 264 is adapted to switch the mode of operation of mobile device 122 based upon the samples taken by sampling module 262 and a threshold value or values. If a sample provided by sampling module 262 is, for example, of a volume level below the threshold value, the mode of operation module ensures that mobile device 122 operates in speakerphone mode. If a sample provided by sampling module 262 is of a volume level above the threshold value, the mode of operation module ensures that mobile device 122 operates in handset mode. Switching between speakerphone mode and handset mode requires mode of operation module 264 to notify the appropriate resources, a phone call operation module for example, so that the appropriate actions can be taken to properly switch between speakerphone mode and handset mode. In one embodiment, switching from speakerphone mode to handset mode includes turning off the speakerphone speaker 234 and speakerphone microphone 236 and turning on the handset speaker 234 and handset microphone 236. In another embodiment, switching from speakerphone mode to handset mode includes turning off the speakerphone speaker 234 and turning on the handset speaker 234. In yet another embodiment, switching from handset mode to speakerphone mode includes turning off the handset speaker 234 and handset microphone 236 and turning on the speakerphone speaker 234 and speakerphone microphone 236. In yet another embodiment, switching from handset mode to speakerphone mode includes turning off the handset speaker 234 and turning on the speakerphone speaker 234. It is to be understood that "turning off" includes turning the physical device off or ceasing to operate in a specific mode of operation for example. It is also to be understood that "turning on" includes turning the physical device on or commencing to operate in a specific mode of operation for example.

Mode of operation module 264 also provides the user of mobile device 122 with the ability to lock mobile device 122 in a desired mode of operation. By selecting the lock option, a user tells mode of operation module 264 that the user does not want mobile device 122 to alternate between handset mode and speakerphone mode regardless of sample input provided by sampling module 262.

Mode of operation module 264 is further adapted to determine an initial mode of operation upon initiation of a voice conversation. The initial mode of operation is determined by mode of operation module 264 in one of a number of ways. For example, the user selects a default mode of operation and mode of operation module 264 behaves according to the user's default selection when initiating a voice conversation. As another example, mode of operation module 264 stores which mode of operation was effectuated during the most recent voice conversation and mode of operation module 264 initiates a new voice conversation using this same mode of operation. As yet another example, sampling module 262 takes a sample of the user's voice at the start of the voice conversation. Before the voice conversation call is answered by the intended participant of the voice conversation, the user of mobile device 122 provides a sample of their voice, by, for example saying the word "speakerphone" or "handset". In this example, sampling module 262 acquires a sample of the user's voice and mode of operation module 264 sets the proper mode of operation based on the sample.

Mode of operation module 264 is further adapted to determine the mode of operation of mobile device 122 using parameters derived from the samples taken by sampling module 262 immediately prior to commencement of a voice conversation. For example, if the ambient noise detected by sampling module 262 is very loud, mode of operation module 264 will raise the value of the threshold to compensate for the likely increased volume of the user's voice and loud background noise. In this example, mode of operation module 264 will increase the threshold by a parameter determined based upon the value of the ambient noise volume level, ensuring that the differential between when a user is holding mobile device 122 to their ear and when the user is holding mobile device 122 away from their ear is determinable using the threshold. Situations exist where a voice conversation is effectuated and the ambient noise level is too great for mode of operation module 264 to properly determine in which mode of operation mobile device 122 is to function as a result of microphone 236 being unable to separate the voice of the user of mobile device 122 from the ambient noise. In such a situation a notification will be presented to the user of mobile device 122, for example a visual cue such as a display message or the flashing of a light attached to auxiliary I/O 228 or an audio cue, to indicate to the user that a predetermined mode of operation will be used and mode of operation module 264 will not automatically alternate the mode of operation of mobile device 122 for the duration of the voice conversation.

The training module (not shown) is also included in programs 258. Once the training module is initiated, the training module determines a threshold by first taking a sample of the user's voice volume while the user is holding mobile device 122 to their ear and by secondly taking another sample of the user's voice volume while the user has placed mobile device 122 away from their ear. The training module preferably provides the user with instructions and feedback using both display 222 and speaker 234. In another embodiment, multiple samples are taken, possibly in different environments, allowing the training module to determine a more versatile threshold, or set of threshold values.

The threshold (not shown) is preferably determined by the training module and can be, for example, a single value or two values. The threshold is used to determine in which mode of operation mobile device 122 operates. A given sample taken by sampling module 262 is compared to the threshold to determine if the sample is above, below or at the threshold.

In the case where the threshold is a single value, X for example, a sample (as taken by sampling module 262) is said to be above the threshold if the sample has a value of X+n where n is greater than zero, a sample is said to be below the threshold if the sample has a value of X+n where n is less than zero and a sample is said to be at the threshold if the sample has a value of X.

In the case the threshold is two values, we can say that the lower limit of the threshold is X and the upper limit of the threshold is X+n where n is greater than zero, any sample whose value falls within the range defined by X to X+n is determined to be at the threshold. Samples whose values are at the threshold are inconclusive and will be filtered by sampling module 262 in a manner similar to white noise or dead time as described above and the mode of operation of mobile device 122 is not changed. In a preferred embodiment a sample's value is representative of the measured volume of a user's voice.

Figure 3:
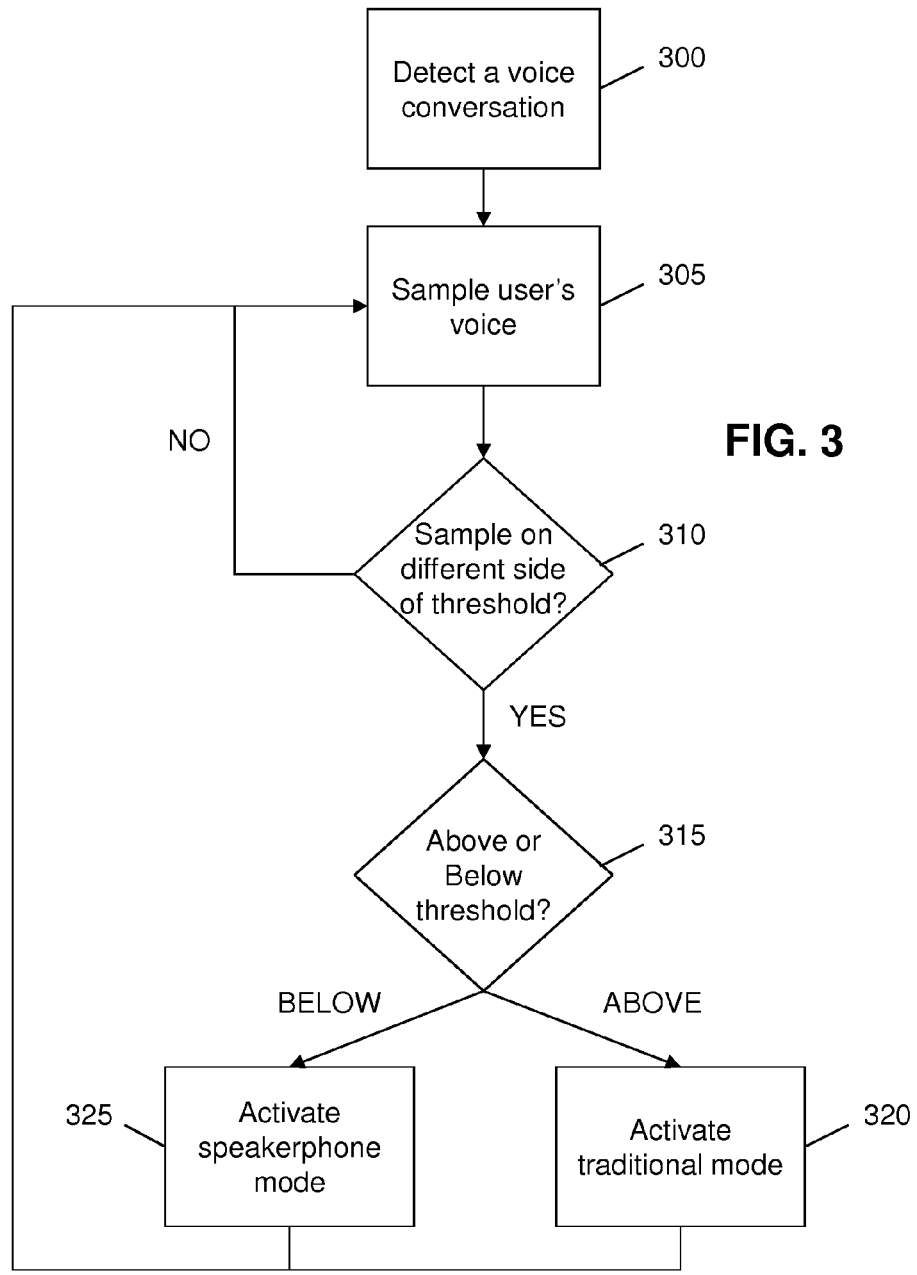
FIG. 3 is a block diagram showing an exemplary method in accordance with a preferred embodiment.

FIG. 3 is a block diagram showing an exemplary method in accordance with a preferred embodiment. The method begins at step 300 where a voice conversation is detected at mobile device 122. In step 305 a sample of the user's voice is taken, preferably by measuring the level of volume detected by microphone 236. Step 305 will filter out undesirable samples as described in the description of sampling module 262 above. In step 310, a determination is made as to whether the sample taken in step 305 is different from a previous sample taken in a previous iteration of step 305. Step 310 determines that a sample is different if the sample is on the other side of the threshold from a previous sample, or if this is the first sample taken at step 305 during the voice conversation detected in step 300. If step 310 determines that the sample taken in step 305 is not different, the method returns to step 305 to take another sample. A suitable delay is used between repeated executions of step 305, 0.5 seconds or 1 second for example. If step 310 determines that the sample taken in step 305 is different, the method moves to step 315 where a determination is made as to whether the sample from step 305 is above or below the threshold. If the sample is above the threshold, step 320 activates handset mode at mobile device 122. If the sample is below the threshold, step 325 activates speakerphone mode at mobile device 122. After execution of step 320 or 325, the method returns to step 305 where another sample of the user's voice will be taken after a short delay. Through the execution of this method, mobile device 122 is able to adaptively operate in the mode of operation which is consistent with the user's current desired mode of operation.

In another preferred embodiment, step 305 will acquire multiple samples of the user's voice during a consecutive period of time, 3 samples in 1.5 seconds for example. Step 310 will evaluate the samples to determine the trend in the user's voice. Continuing with the example of step 305 providing 3 samples in 1.5 seconds and where mobile device 122 is currently operating in speakerphone mode. If the first sample is above the threshold, the second sample is below the threshold and the third sample is above the threshold step 310 will determine that, based on the trend of the three samples, the user's voice is on a different side of the thresholds. Continuing with this example, step 315 will determine that the average of the three samples is above the threshold and step 320 will activate handset mode.

It is to be understood that other configurations of the method described by FIG. 3 are possible. For example, step 310 could be removed from the method, step 305 would provide a sample directly to step 315 which would make the determination as to whether the sample is above or below the threshold. As another example, step 305 could acquire 2 samples in 1 second or 4 samples in 1 second.

Figure 4:
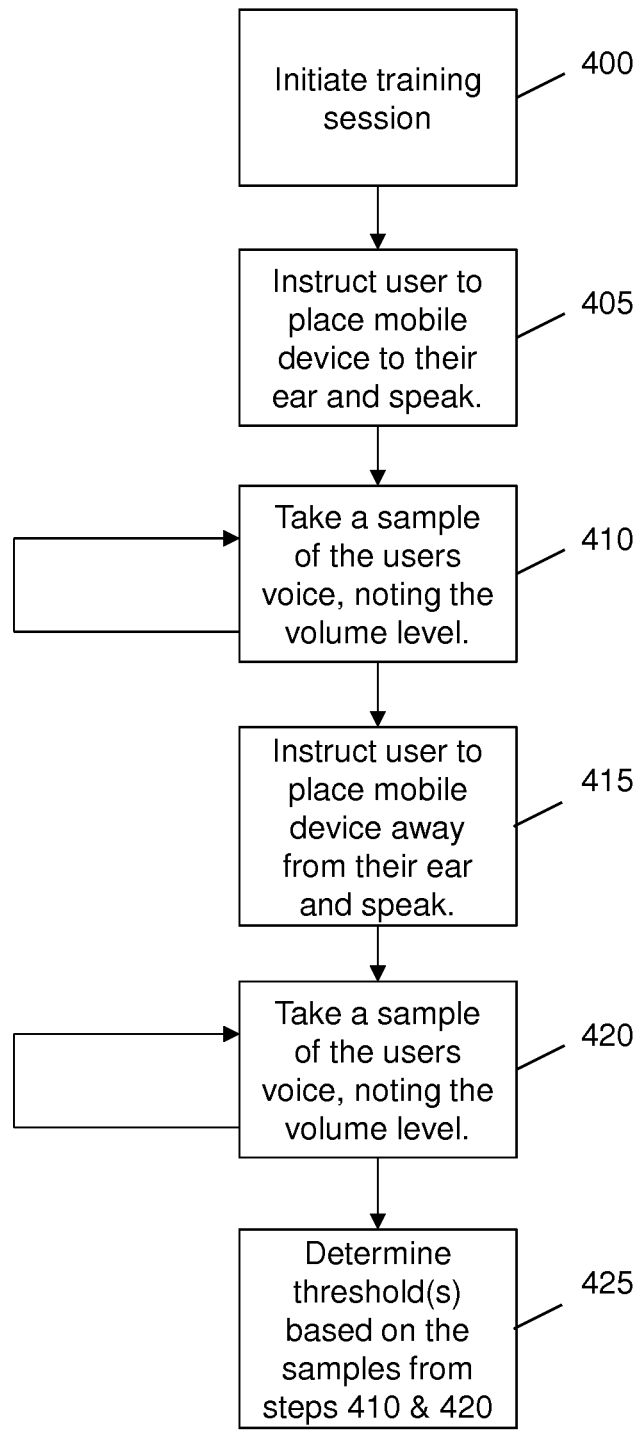
FIG. 4 is a block diagram showing an exemplary training method in accordance with a preferred embodiment.

FIG. 4 is a block diagram showing an exemplary training method in accordance with a preferred embodiment. The method begins at step 400 where a training session is initiated at mobile device 122. The training session is preferably initiated by the user of mobile device 122, upon activation or by effectuating the training session from a menu or other similar display item. In another embodiment, the training session is initiated by mobile device 122 during an initial setup procedure. Upon initiation of the training session at step 400, mobile device 122 provides some instruction to the user of mobile device 122 regarding how the training session is to proceed; this is accomplished through the use of display 222 and/or speaker 234. In step 405 the user is asked to place mobile device 122 to their ear and to speak in a normal manner. Step 410 is designed to simulate a user's typical use of mobile device 122 in handset mode. Step 410 is activated preferably by the user of mobile device 122 activating a button on keyboard 232 or by the activation of another button on mobile device 122. In another embodiment, step 410 is activated after a suitable delay from presenting instructions to the user in step 405 or once microphone 236 receives input indicative that the user has begun talking. At step 410 sampling module 262 takes a sample of the user's voice and notes the volume of the user's voice. It should be understood that step 410 can be repeated a number of times for greater accuracy by averaging the volume level of all samples taken. Upon collection of the required number of samples, mobile device 122 will notify the user, preferably using an audible noise from speaker 234, that step 410 is complete. In step 415 the user is asked to place mobile device 122 away from their ear and to speak in a normal manner. Step 420 is designed to simulate a user's typical use of mobile device 122 in handset mode. At Step 420 is activated preferably by the user of mobile device 122 activating a button on keyboard 232 or by the activation of another button on mobile device 122. In another embodiment, step 420 is activated after a suitable delay from presenting instructions to the user in step 415 or once microphone 236 receives input indicative that the user has begun talking. At step 420 sampling module 420 takes a sample of the user's voice and notes the volume of the user's voice. It should be understood that step 420 can be repeated a number of times for greater accuracy by averaging the volume level of all samples taken. Upon collection of the required number of samples, mobile device 122 will notify the user, preferably using an audible noise from speaker 234, that step 420 is complete. At step 425 the threshold to be used in the method described in FIG. 3 is determined. Based on the volume levels (or average volume levels) acquired during steps 410 and 420, mobile device 122 is capable of determining a threshold above which handset mode should be used and below which speakerphone should be used. A preferred embodiment determines the threshold to be the halfway point between the volume level (or average volume level) acquired at step 410 and the volume level (or average volume level) acquired at step 420. In another embodiment the threshold is determined to be closer to the volume level (or average volume level) acquired at step 420 than volume level (or average volume level) acquired at step 410 to compensate for ambient noise.

It is to be understood that other configurations of the method described by FIG. 4 are possible. For example, step 405 and 410 could be switched with steps 415 and 420 to achieve the desired resultant threshold value.

In another embodiment, the user of mobile device 122 can initiate a training session wherein the user manually indicates to mobile device 122 which mode the device should be operating in at a given moment. For example, the user could hold mobile device 122 away from their ear while speaking and the user could inform mobile device 122, through any suitable input means, that mobile device 122 should record the current level of voice volume as requiring speakerphone mode.

In yet another embodiment, the user of mobile device 122 can test how mobile device 122 switches between handset mode and speakerphone mode. During a test, the user of mobile device 122 can move themselves or mobile device 122 while talking, to see which mode mobile device 122 selects. Should mobile device 122 not select the appropriate mode of operation, the user can retrain mobile device 122.

In even yet another embodiment, the training session passively collects samples during normal use of mobile device 122 for voice conversations. The passive sampling data are stored for use by mobile device 122 if and when the user decides to have mobile device 122 adaptively switch its mode of operation.

It is also to be understood that mobile device 122 could be used by multiple users. In this embodiment, mobile device 122 stores threshold values for each of the multiple users and uses the proper threshold value depending on the user who is currently using the device. Mobile device 122 determines which user is using a device based on log in credentials supplied by the user or by determining which user is currently using the device based on attributes of samples of the user's voice for example.

The invention has been illustrated by means of a description of a number of embodiments. These are not intended to be limiting examples. It will be obvious to one skilled in the art that variations and modifications may be made without departing from the sprit of the invention or the scope of the appended claims.

The present disclosure further includes the following clauses.
1. A method for adaptively switching a mode of operation of a mobile device, the method comprising:
   detecting at the mobile device a voice conversation;
   sampling a user's voice during the voice conversation to produce at least one sample of the user's voice; and
   selectively switching the mode of operation of the mobile device based on said sampling of the user's voice.
2. The method of clause 1 wherein the step of sampling further includes filtering out undesirable samples.
3. The method of clause 1 wherein the at least one sample is at least one volume sample.
4. The method of clause 1 wherein the at least one sample is at least one frequency sample.
5. The method of clause 1 wherein the step of sampling comprises measuring the volume of the user's voice.
6. The method of clause 1 further comprising the step of training the mobile device to determine a threshold.
7. The method of clause 1 further comprising, prior to detecting the voice conversation, the step of training the mobile device to determine a threshold.
8. The method of clause 6 wherein the step of training comprises the steps of:
   sampling the user's voice while the user is holding the mobile device to their ear and the user is talking; and
   sampling the user's voice while the user is not holding the mobile device to their ear and the user is talking.
9. The method of clause 7 wherein the step of training comprises the steps of:
   sampling the user's voice while the user is holding the mobile device to their ear and the user is talking; and
   sampling the user's voice while the user is not holding the mobile device to their ear and the user is talking.
10. The method of clause 3 wherein the step of selectively switching the mode of operation comprises:
    if the at least one volume sample is above a volume threshold, setting the mode of operation to handset mode; and
    if the at least one volume sample is below the volume threshold, setting the mode of operation to speakerphone mode.
11. The method of clause 3 wherein the step of selectively switching the mode of operation comprises:
    if an average volume level of the at least one volume sample is above a volume threshold, setting the mode of operation to handset mode; and
    if the average volume level of the at least one volume sample is below the volume threshold, setting the mode of operation to speakerphone mode.
12. A mobile device capable of adaptively switching its mode of operation, the mobile device comprising:
    a detecting module adapted to detect a voice conversation;
    a sampling module adapted to sample a user's voice during the detected voice conversation; and
    a mode of operation module adapted to selectively switch the mobile device's mode of operation based on said sampling of the user's voice.
13. The mobile device of clause 12 wherein the sampling module samples ambient noise prior to commencement of the voice conversation.
14. The mobile device of clause 12 further comprising a threshold value wherein the mode of operation module compares the sampling of the user's voice to the threshold value.
15. The mobile device of clause 14 wherein the ambient noise samples are used to scale the threshold value.
16. A method for training a mobile device to adaptively switch a mode of operation of the mobile device, the method comprising:
    sampling a first level of input while the mobile device is in a first mode of operation;
    sampling a second level of input while the mobile device is in a second mode of operation; and
    determining a threshold based on the first level of input and the second level of input.
17. The method of clause 16 wherein the method is executed passively.
18. The method of clause 16 wherein the method is executed as a result of user interaction.
19. The method of clause 16 wherein the step of training is executed automatically.

We claim:
1. A method for adaptively switching a mode of operation between a speakerphone mode and a handset mode on a mobile device, the method comprising:

detecting at the mobile device that a voice conversation is being carried out or is about to be initiated;

sampling the voice of a user of the mobile device during the voice conversation to determine a level of at least one characteristic of the user's voice; and selectively switching the mode of operation between the speakerphone mode and the handset mode of the mobile device based on the sampling of the user's voice, the switching comprising:

turning off a speakerphone speaker and a speakerphone microphone of the mobile device, and turning on a handset speaker and a handset microphone of the mobile device if the at least one voice sample characteristic level is above a threshold value; and turning off a handset speaker and a handset microphone of the mobile device, and turning on a speakerphone speaker and a speakerphone microphone of the mobile device if the at least one voice sample characteristic level is below the threshold value.

2. The method of claim 1 wherein the at least one characteristic comprises volume.

3. The method of claim 1 wherein the at least one characteristic comprises frequency.

4. The method of claim 1 wherein the sampling comprises measuring the volume level of the user's voice.

5. The method of claim 4 wherein the threshold value is a volume threshold value.

6. The method of claim 1, further comprising:
detecting an ambient noise level upon detecting that the voice conversation is about to be initiated.

7. The method of claim 6, wherein the threshold value depends on the ambient noise level.

8. The method of claim 1, wherein the sampling further includes filtering out undesirable voice samples.

9. The method of claim 1, wherein the detecting utilizes a status value stored at the mobile device.

10. The method of claim 1, wherein the detecting queries a current status of a radio on the mobile device.

11. The method of claim 1, wherein the sampling further comprises determining whether a user of the mobile device is currently speaking.

12. The method of claim 11, wherein the determining whether a user is speaking utilizes voice characteristics of a user.

13. The method of claim 1, wherein the switching notifies a phone call operation module to switch the mode of operation of the mobile device.

14. A mobile device capable of adaptively switching its mode of operation between a handset mode and a speakerphone mode, the mobile device comprising:

a detecting module adapted to detect that a voice conversation is being carried out or is about to be initiated;

a sampling module configured to sample the voice of a user of the mobile device during the detected voice conversation and to determine a level of at least one characteristic of the user's voice; and a mode of operation module adapted to selectively switch the mobile device's mode of operation between the handset mode and the speakerphone mode based on the sampling of the user's voice, the mode of operation module adapted to:

turning off a speakerphone speaker and a speakerphone microphone of the mobile device, and turning on a handset speaker and a handset microphone of the mobile device if the at least one voice sample characteristic level is above a threshold value; and turning off a handset speaker and a handset microphone of the mobile device, and turning on a speakerphone speaker and a speakerphone microphone of the mobile device if the at least one voice sample characteristic level is below the threshold value.

15. The mobile device of claim 14, wherein the sampling module is further configured to establish an ambient noise level prior to commencement of the voice conversation.

16. The mobile device of claim 15 wherein the ambient noise samples are used to scale the threshold value.

17. The mobile device of claim 14, wherein the detecting module is configured to utilize a status value stored at the mobile device.

18. The mobile device of claim 14, wherein the detecting module is configured to query a current status of a radio on the mobile device.

19. The mobile device of claim 14, wherein the sampling module is configured to determine whether a user of the mobile device is currently speaking.

20. The mobile device of claim 19, wherein the sampling module is configured to utilize voice characteristics of a user to determine whether a user is speaking.

21. The mobile device of claim 14, wherein the mode of operation module is configured to notify a phone call operation module to switch the mode of operation of the mobile device.

22. The mobile device of claim 21, wherein the phone call operation module is configured to turn on or to turn off a speakerphone speaker, a speakerphone microphone, a handset speaker and a handset microphone on the mobile device.

23. A tangible non-transitory computer readable storage medium storing a program code which when executed by a processor of a mobile device causes the mobile device to:

detect at the mobile device that a voice conversation is being carried out or is about to be initiated;

sample the voice of a user of the mobile device during the voice conversation to determine a level of at least one characteristic of the user's voice; and selectively switch a mode of operation between a speakerphone mode and a handset mode of the mobile device based on the sampling of the user's voice, the switch comprising:

turning off a speakerphone speaker and a speakerphone microphone of the mobile device, and turning on a handset speaker and a handset microphone of the mobile device if the at least one voice sample characteristic level is above a threshold value; and turning off a handset speaker and a handset microphone of the mobile device, and turning on a speakerphone speaker and a speakerphone microphone of the mobile device if the at least one voice sample characteristic level is below the threshold value.

* * * * *